UNITED STATES PATENT OFFICE.

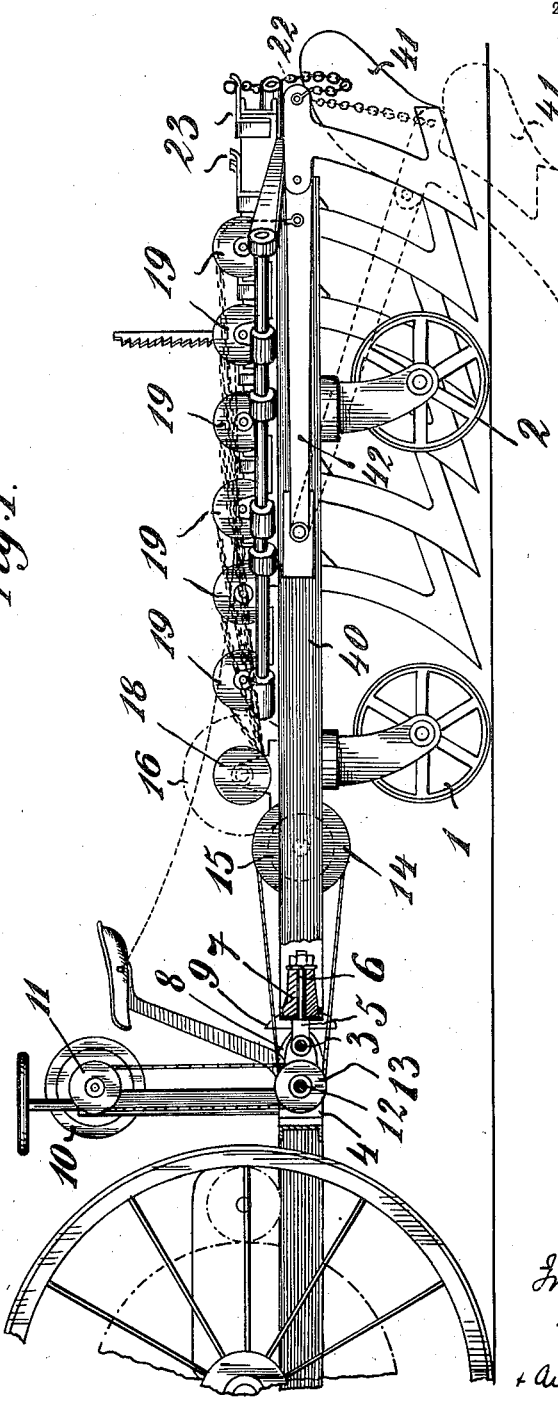

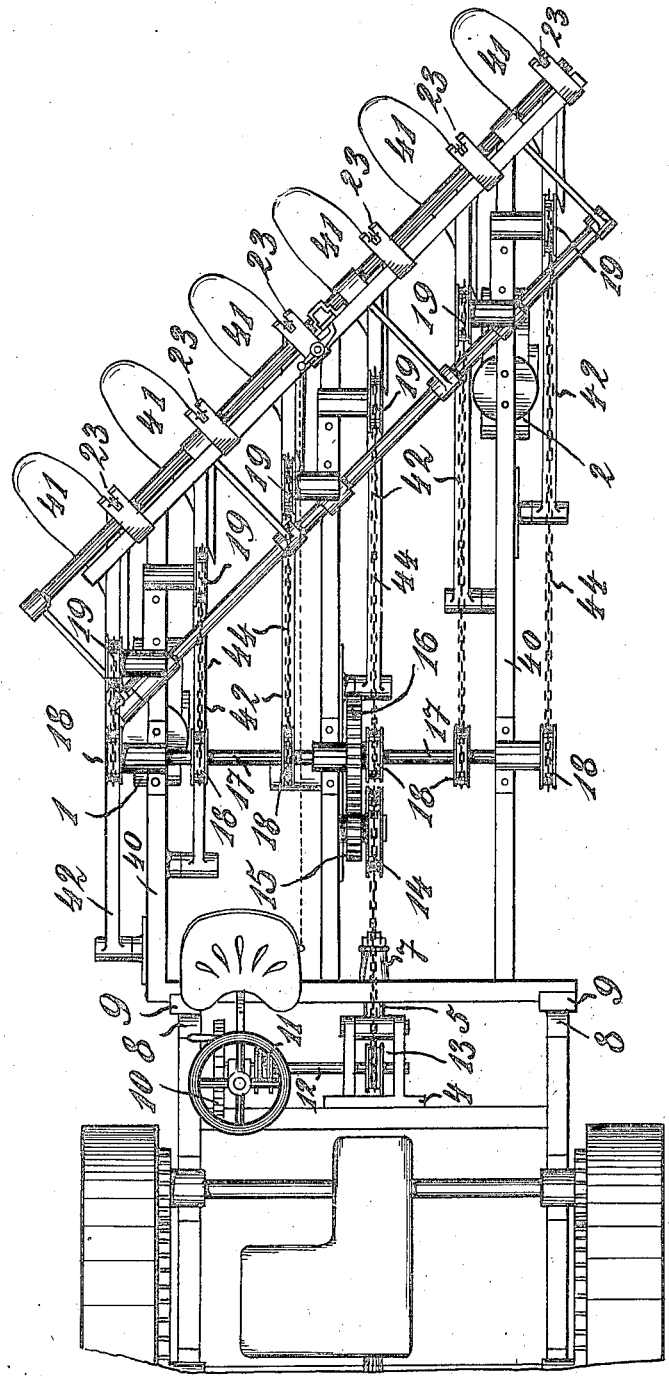

GUSTAV HINTZE, OF BERLIN, AND AUGUST ROSEWICK, OF MERSEBURG, GERMANY, ASSIGNORS TO ALFRED C. BLANCKE, OF BRUSSELS, BELGIUM.

MOTOR-PLOW.

1,091,885.  Specification of Letters Patent.  Patented Mar. 31, 1914.

Application filed May 20, 1912. Serial No. 698,511.

*To all whom it may concern:*

Be it known that we, GUSTAV HINTZE and AUGUST ROSEWICK, both subjects of the King of Prussia, and residing at No. 25 Lüneburgerstrasse, Berlin, and No. 20 Weisse Mauer, Merseburg, Germany, have invented certain new and useful Improvements in Motor-Plows, of which the following is a specification.

The present invention relates to a motor-plow, comprising a tractor and a wheeled truck coupled to it.

It embodies several improvements in motor-plows of this kind, which particularly relate to the coupling between tractor and plow-truck, and the necessary gears for operating the plow shares from the tractor.

The motor-plows hitherto employed have mostly shown the disadvantage, that in consequence of the large space required for turning, large pieces at the corners of the field under treatment will remain untouched, which have to be subsequently finished by means of horse-drawn plows.

The principal object of the present invention is to avoid these disadvantages. This object is obtained according to the present invention by the two members, the tractor and the plow-truck being coupled by means of a link and being supported by abutments at the sides in such a manner, that when the aggregate is traveling over uneven soil, the members may swivel on horizontal axis relatively to each other, but not on a vertical axis. By such means it is rendered possible that the drawn truck together with the plow-shares attached thereto can follow the irregularities of the soil independently of the tractor, and yet the tractor can drive backward together with the plow-truck attached.

The invention further relates to a special type of a power transmission gear adapted to this peculiar coupling, for transmitting the power to operate the lifting gear for the plow-shares, from the tractor to the plow-truck. The power transmission gear differs from the known types in that the chain-gear transmitting the power is disposed in the axis of the pin on which the two members swivel relatively to each other, so that such relative displacement of the two motor-plow members will have no detrimental effect on the chain-gear.

In the accompanying drawings the present invention is exemplified in a constructional form.

Figure 1 is a side view of the rear part of the tractor with the plow-truck attached to it; and Fig. 2 is a plan of Fig. 1.

To the frame 40 of the plow-truck are fitted the bodies 42, carrying the plow-shares 41. The tractor is coupled to the plow-truck, which runs on the road-wheels 1 and 2, by means of a pin 3, journaled in a forked casting 4 on the tractor and readily detachable therefrom for disconnecting the members coupled. The traction-eye 5 attached to the truck and journaled on the pin 3 has, as evident from the sectional view in Fig. 1, a cylindrical shank 6 lying in the longitudinal axis of the two vehicles, and adapted to easily swivel in its guide 7 attached to the frame of the truck. Whereas the link formed by the pin 3 and the eye 5 admits of the truck-frame swiveling in vertical longitudinal plane, the shank 6 allows of the two vehicles twisting relatively to each other, so that on very irregular, uneven soil the truck can so adjust itself to the tractor, that its two wheels will always run on the soil. This would, indeed, also be the case if in place of the aforesaid link a common limber-hook and -eye were employed of the kind as used for ordnance vehicles. But a coupling of this kind has disadvantages, which render it unsuited for the purpose of the present invention. It will namely only be possible to back the vehicles coupled if the trailer, which automatically alines itself to the tractor during the forward travel, is prevented from turning aside while backing. Theoretically the afore described link, which does not allow of an oscillation in a horizontal plane, would meet these requirements; but in practice very great stresses will have to be met, which would endanger the durability of the link, the latter is therefore relieved of these stresses by the arrangement shown in Figs. 1 and 2.

At the rear ends of the longitudinal beams or at other suitable points of the tractor two buffer-like abutments 8 are provided, having their rearward face-ends curved to a circle the center of which lies in the extension of the axis of pin 3. Against these curved face-ends two flat plates 9 bear, which are provided at the front end of the trailer, and prevent an excessive strain on the link by dangerous bending stresses, without impairing the movements intended by the construction of the link 3, 4, 5.

The above described arrangement has the effect that the trailer remains in the same position to the tractor both during the forward and the backward travel, so that, on the one hand, the plow-shares 41 must absolutely follow the tractor while plowing, and cannot be forced out of the straight line by any obstructions, while on the other hand, the whole motor-plow can travel backward after the plow-shares have been lifted out of the soil. This has hitherto not been possible with the known motor-plow consisting of tractor and plow trailer. For obvious reasons the road-wheels of the trailer must be so arranged, that they will automatically aline themselves in the direction of travel.

On the steering pillar of the tractor is journaled a handwheel with crank-handle, in a position, easily accessible to the driver. To the shaft of this handwheel is keyed a sprocket, on shaft 12 is another sprocket, which is driven by means of a chain from sprocket 11. The shaft 12 is journaled at one end in a bearing at the foot of the steering pillar, at the other end in transverse bores in the casting 4, so that it is on the same level with the pin 3. To the part of this shaft 12 between the two legs of the fork 4 is keyed a sprocket 13 exactly in the extension of the axis of the cylindrical shank 6; this sprocket 13 will therefore follow every turn of the handwheel 10.

On a pin fitted in the frame of the trailer is journaled a sprocket 14, through the center and central plane of which the rearward extension of the axis of shank 6 will pass. To this sprocket is rigidly attached, and therefore likewise journaled on the said pin, a pinion 15. As may be seen from Figs. 1 and 2, the sprocket 14 and with it the pinion 15 are driven by means of a chain from sprocket 13.

The chain-gear just described will have to meet very exceptional duties, as when the machine is traveling over uneven, rough ground, not only the distance between the two sprocket-shafts will vary, but these shafts will also twist relatively to each other.

In consequence of the center of the link-pin 3 being situated exactly in the line connecting the two sprocket-centers the difference in the distance will not be very considerable, while the effect of the relative twist of the two shafts will be reduced to a minimum in consequence of the two sprockets having been arranged exactly in the axis of this twisting movement. By employing a suitable kind of chain (a calibrated link-chain) a reliable working gear will therefore be obtained.

With the pinion 15 meshes the gear-wheel 16, which is keyed to a shaft 17, running in three bearings fitted to the frame of the trailer. To this shaft are keyed six wheels 18, to the peripheries of which are secured the ends of six chains 44 or the like suitable hoisting elements, so that when the said wheels 18 are revolved, these hoisting elements will be wound up thereon. The free ends of the six chains are secured to the plow-shares, and as the latter are not directly beneath the wheels 18, guide-wheels 19 are provided at suitable points on the frame, and vertically above the points at which the chains are secured to the plow-shares. If the handwheel 10 is now turned around to the right, all six plow-shares are lifted, when the handwheel is let go it will run back under the action of the weight of the shares and admit of the latter again sinking down.

In order to dispense with having to hold the handwheel when the plow-shares have been lifted, so that the latter will not sink, a ratchet-wheel may be provided on shaft 12 in which a pawl coupled to a pedal is engaged under action of a spring. When the shaft 12 is turned by means of the handwheel, this pawl will prevent it from running back and the lifted shares will be held in such lifted position. The pawl-pedal, which for simplicity has not been shown in Figs. 1 and 2 is arranged under the right foot of the driver. When it is pressed down, the previously lifted plow-shares will automatically sink down to the ground. For adjusting the drop of the plow-shares a chain 22 is provided at the rear end of each share and may be hooked into forks 23 on the truck-frame.

We claim:

1. Motor-plow consisting of a tractor and a plow-truck coupled thereto, a coupling connecting the said two members adapted to allow them to swivel on horizontal axes but not on a vertical axis relatively to each other, while riding over uneven ground, buffer-like abutments provided at the sides of the ends of the said members.

2. Motor-plow consisting of a tractor and a plow-truck coupled thereto, a coupling connecting the said two members adapted to allow them to swivel on horizontal axes but not on a vertical axis relatively to each other, while riding over uneven ground, buffer-like abutments provided at the sides of the ends of the members, the said coupling consisting of a fork attached to the one member and a T-shaped part swiveling in the fork and
5 adapted to serve as pivot for the second member, the said abutments having the shape of circular curves lying in the axis of oscillation of the T-shaped part.

In testimony whereof, we affix our signatures in presence of two witnesses.

GUSTAV HINTZE.
AUGUST ROSEWICK.

Witnesses:
 HENRY HASPER,
 WOLDEMAR HAUPT.